United States Patent
Bolding et al.

(10) Patent No.: US 7,272,651 B1
(45) Date of Patent: Sep. 18, 2007

(54) RSVP TRANSMITTER PROXY

(75) Inventors: Allan Bolding, Half Moon Bay, CA (US); Dinesh G. Dutt, Sunnyvale, CA (US); Silvano Gai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 606 days.

(21) Appl. No.: 09/940,753

(22) Filed: Aug. 28, 2001

(51) Int. Cl.
G06F 15/16 (2006.01)
(52) U.S. Cl. .................. 709/227; 709/231
(58) Field of Classification Search ............ 709/202, 709/232, 233, 234, 235, 203, 217–219, 223–231; 705/14; 725/32, 34–35
See application file for complete search history.

(56) References Cited

U.S. PATENT DOCUMENTS

| | | | | |
|---|---|---|---|---|
| 6,058,113 | A * | 5/2000 | Chang ...................... | 370/390 |
| 6,091,709 | A | 7/2000 | Harrison et al. | |
| 6,101,549 | A * | 8/2000 | Baugher et al. ............ | 709/238 |
| 6,286,052 | B1 * | 9/2001 | McCloghrie et al. ....... | 709/238 |
| 6,519,636 | B2 * | 2/2003 | Engel et al. ................ | 709/223 |
| 6,621,793 | B2 * | 9/2003 | Widegren et al. .......... | 370/230.1 |
| 6,721,272 | B1 * | 4/2004 | Parnafes et al. ............ | 370/235 |
| 6,763,392 | B1 * | 7/2004 | del Val et al. .............. | 709/231 |
| 6,765,927 | B1 * | 7/2004 | Martin et al. ............... | 370/469 |
| 2002/0021680 | A1 * | 2/2002 | Chen .......................... | 370/331 |
| 2002/0087699 | A1 * | 7/2002 | Karagiannis et al. ....... | 709/227 |
| 2002/0133600 | A1 * | 9/2002 | Williams et al. ............ | 709/228 |
| 2002/0197996 | A1 * | 12/2002 | Popovich ................... | 455/445 |
| 2003/0103510 | A1 * | 6/2003 | Svanberg et al. .......... | 370/395.2 |
| 2004/0081098 | A1 * | 4/2004 | Sakai ........................ | 370/236.1 |
| 2004/0139088 | A1 * | 7/2004 | Mandato et al. ............ | 707/100 |

OTHER PUBLICATIONS

Request for Comment 2326.*
Request for Comment 2996.*
Request for Comment 2205.*
Gai et al. RSVP Proxy—Network Working Group Internet Draft; Jul. 2000.*
Merwe et al. mmdump: A tool for Monitoring Internet Multimedia Traffic; 2000.*
Henning Schulzrinne, "Internet Media-on-Demand: The Real-Time Streaming Protocol," Department of Computer Science, Columbia University, May 28, 1999, New York, New York, pp. 1-44.

(Continued)

Primary Examiner—Glenton B. Burgess
Assistant Examiner—Sean Reilly
(74) Attorney, Agent, or Firm—Cesari and McKenna LLP (57) ABSTRACT

A Resource reSerVation Protocol (RSVP) transmitter proxy reserves network resources on behalf of a multimedia server that lacks RSVP facilities. The RSVP transmitter proxy is preferably disposed in an intermediate network device that is proximate to (e.g., one hop away from) the respective server, and includes a classification engine configured to identify network traffic passing through the network device, and a media session manager for maintaining state and other information for streams and/or sessions being provided by the server. The classification engine may snoop messages exchanged between the server and a client to identify the traffic flow characteristics and bandwidth of a stream. The RSVP transmitter uses the snooped information to generate and send RSVP Path messages on behalf of the server and to terminate RSVP Reservation messages sent to the server, thereby causing network resources to be reserved for the stream.

34 Claims, 9 Drawing Sheets

OTHER PUBLICATIONS

Rao, Anup and Lanphier, Rob, "Internet Draft: Real Time Streaming Protocol (RTSP)," Nov. 26, 1996.

Busse, Deffner, et al., "Dynamic QoS Control of Multimedia Applications based on RTP," GMD-Fokus, Hardenbergplatz 2, D-10623 Berlin, May 30, 1995.

"Using RTSP with Firewalls, Proxies, and Other Intermediary Network Devices," Version 2.0/rev.2, 1998, Realworks, Inc.

Johnston, Vicki and Marjory Johnston, "Higher Level Protocols Used with IP Multicast: An IP Multicast Initiative White Paper," 1999.

Network-Based Application Recognition, Release 12.0(5)XE2, 12.1(1)E, and 12.1(2)E, Jun. 2000.

Schulzrinne, et al., "RTP: A Transport Protocol for Real-Time Applications," Network Working Group, RFC 1889, Jan. 1996.

Schulzrinne, et al., Real Time Streaming Protocol (RTSP), Network Working Group, RFC 2326, Apr. 1998.

Handley, et al., "SDP: Session Description Protocol," Network Working Group, RFC 2327, Apr. 1998.

Braden, et al., "Resource ReSerVation Protocol (RSVP)—Version 1 Functional Specification," Network Working Group, RFC 2205, Sep. 1997.

* cited by examiner

DESCRIBE rtsp://server.example.com/fizzle/foo RTSP/1.0 — 502
CSeq: 312 — 504
<CRLF> — 506

FIG.5A

512 {
RTSP/1.0 200 OK — 516
CSeq: 312 — 518
Date: 23 Jan 1997 15:35:06 GMT — 520
Content-Type: application/sdp — 522
Content-Length: 376 — 524
<CRLF> — 526
}

514 {
v=0
o=mhandley 2890844526 2890842807 IN IP4 126.16.64.4
s=SDP seminar
i=A seminar on the session description protocol
u=http://www.cs.ucl.ac.uk/staff/M.Handley/sdp.03.ps
e=mjh@isi.edu (Mark Handley)
c=IN IP4 224.2.17.12/127
t=2873397496 2873404696
m=audio 3456 RTP/AVP 0
a=control:rtsp://audio.server.example.com
b=CT:128
m=video 2232 RTP/AVP 31
a=control:rtsp://video.server.example.com
b=
}

FIG.5B

```
                    ┌─ 530
                    ↓
SETUP rtsp://server.example.com/fizzle/foo RTSP/1.0 ─── 532
CSeq: 302 ─── 534
Transport: RTP/AVP;unicast;client_port=4588-4589 ─── 536
```

FIG.5C

```
                    ┌─ 540
                    ↓
RTSP/1.0 200 OK ─── 542
CSeq: 302       ─── 544
Date: 23 Jan 1997 15:35:06 GMT ─── 546
Session: 47112344 ─── 548
Transport: RTP/AVP;unicast;client_port=4588-4589;server_port=6256-6257 ─── 550
```

RSVP TRANSMITTER PROXY

BACKGROUND OF THE INVENTION

1. Field of the Invention

This invention relates to computer networks, and more specifically, to a network protocol proxy.

2. Background Information

Computer networks typically comprise a plurality of interconnected entities. An entity may consist of any device, such as a computer or end station, that "sources" (i.e., transmits) or "sinks" (i.e., receives) datagrams (e.g., packets and/or frames). A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack). In many instances, several LANs may be interconnected by point-to-point links, microwave transceivers, satellite hook-ups, etc. to form a wide area network ("WAN") or intranet that may span an entire country or continent.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information between a plurality of LANs or end stations. Bridges and switches may operate at various levels of the communication protocol stack. For example, a switch may operate at layer 2 which, in the Open Systems Interconnection (OSI) Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to whom the message is being sent, referred to as the destination address. To perform the switching function, layer 2 switches examine the MAC destination address of each data frame received on a source port. The frame is then switched onto the destination port(s) associated with that MAC destination address.

Other network devices, commonly referred to as routers, may operate at higher communication layers, such as layer 3 of the OSI Reference Model, which in TCP/IP networks corresponds to the Internet Protocol (IP) layer. Data frames at the IP layer also include a header which contains an IP source address and an IP destination address. Routers or layer 3 switches may re-assemble or convert received data frames from one LAN standard (e.g., Ethernet) to another (e.g. token ring). Thus, layer 3 devices are often used to interconnect dissimilar subnetworks.

Multimedia Applications

Increasingly, computer networks are being called upon to support time-sensitive traffic, such as the transmission of audio and/or video files in real-time. More specifically, technology has recently been developed to support streaming multimedia applications. With streaming, a user can begin playing or listening to the corresponding content as it is being received at his or her computer. That is, the user does not have to wait until the entire file is downloaded before playing the content as was previously the case. Sources of data for streaming can include both live feeds, such as videoconferences, concerts, etc., and stored clips or files.

To support streaming multimedia traffic, a number of real-time oriented network protocols have been developed and/or proposed. The Real-time Transport Protocol (RTP), for example, provides end-to-end delivery services to support applications transmitting real-time data. RTP typically runs on top of the User Datagram Protocol (UDP) to utilize its multiplexing and checksum services, although other transport protocols besides UDP may also be used. RTP is a proposed standard from a working group of the Internet Engineering Task Force (IETF), which is an independent standards organization, and is described at Request for Comments (RFC) 1889. RTP defines several messages that specify the type of audio encoding being used, e.g., pulse code modulation (PCM). RTP messages also contain timestamps and sequence numbers which are used by a receiver to reconstruct the timing produced by the source.

The Real-Time Control Protocol (RTCP) works in conjunction with RTP, and is responsible for the management of the real-time session between the source and the receiver. During an RTP session, RTCP reports are periodically sent back-and-forth between the receiver and the source. These reports provide feedback regarding reception quality and are also used to control the session and provide diagnostic services. The feedback may include the number of packets sent, the number of packets lost, jitter, etc. This information can then be used by the source to modify its transmission so as to eliminate or at least reduce identified problems. The Session Description Protocol (SDP) is used to announce multimedia sessions. It specifies a short, structured textual file format for describing sessions, including the name and purpose of the session, the media, protocols, bandwidth requirements, timing and transport information. In particular, it provides the information needed to join and thus receive a multimedia session including streaming media sessions. SDP was developed by the Multiparty Multimedia Session Control (MMSC) working group of the IETF, and is found at RFC 2327.

The Real-Time Streaming Protocol (RTSP) is an application-level protocol for use in controlling streaming sessions. It typically works on top of RTP to both control and deliver real-time content. RTSP provides receivers of streams with "VCR-style" control functionality, such as pause, fast forward, reverse, etc. It is set forth at RFC 2326.

Allocation of Network Resources

Computer networks include numerous services and resources for use in forwarding network traffic, e.g., packets and frames, throughout the network. For example, different network links, such as Fast Ethernet, Asynchronous Transfer Mode (ATM) channels, network tunnels, satellite links, etc., offer unique speed and bandwidth capabilities. Particular intermediate devices also include specific resources or services, such as priority queues, filter settings, queue selection strategies, congestion control algorithms, etc. Depending on the selection or allocation of such resources or services, network traffic can be forwarded at different speeds or rates. To take advantage of these services and resources, individual frames or packets can be marked so that intermediate devices will treat them in a predetermined manner.

Figure 1A:
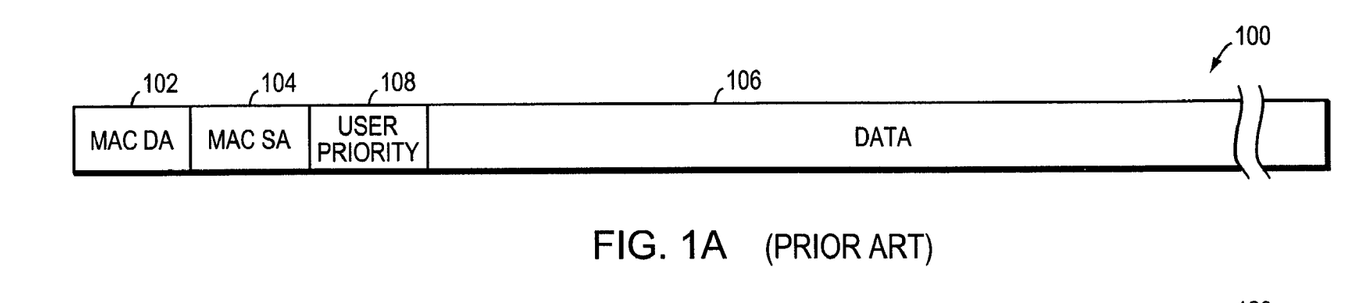
FIGS. 1A-C, previously discussed, are partial block diagrams of network messages.

More specifically, the Institute of Electrical and Electronics Engineers (IEEE), in an appendix (802.1p) to the 802.1D bridge specification standard, describes additional information that can be loaded into the MAC header of Data Link Layer frames. FIG. 1A is a partial block diagram of a Data Link frame 100 which includes a MAC destination address (DA) field 102, a MAC source address (SA) field 104 and a data field 106. In accordance with the 802.1p standard, a user_priority field 108, among others, is inserted after the MAC SA field 104. The user_priority field 108 may be loaded with a predetermined value (e.g., 0-7) that is associated with a particular treatment. Possible treatments include background, best effort, excellent effort, etc. Network devices examine the user_priority field 108 of received frames 100 and apply the corresponding treatment to the frames. For example, an intermediate device may have a plurality of transmission priority queues per port, and may assign frames to different queues of a destination port on the basis of the frame's user priority value.

Figure 1B:
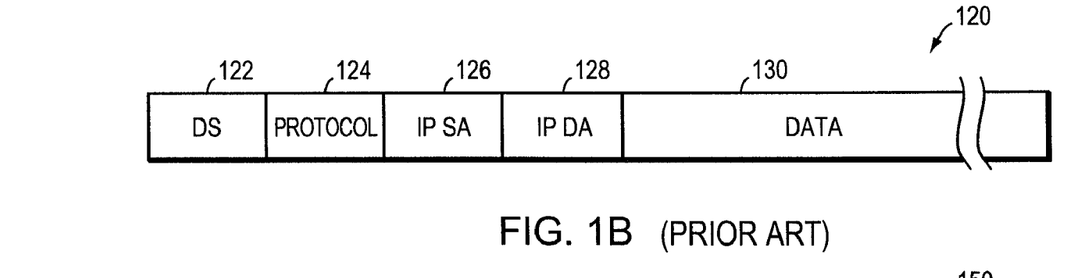

FIG. 1B is a partial block diagram of a Network Layer packet 120 corresponding to the Internet Protocol (IP), such as IPv4. Packet 120 includes a one octet differentiated services (DS) field 122 that can be loaded with a differentiated services codepoint (DSCP) value. Currently, DSCP values are 6-bits, leaving 2-bits of the DS field 122 unused. Packet 120 further includes a protocol field 124, an IP source address (SA) field 126, an IP destination address (DA) field 128 and a data field 130. The ToS field 122 was intended to be used to specify a particular service to be applied to the packet 120, but it is rarely used. The protocol field 124 is used to identify the next higher protocol that is to receive the packet. Version 6 of the Internet Protocol (IPv6) similarly includes a DS field, formerly known as the traffic class field.

Layer 3 devices that are DS compliant apply a particular per-hop forwarding behavior to packets based on the contents of their DS fields 122. Examples of per-hop forwarding behaviors include expedited forwarding and assured forwarding. By setting the DS field 122 with the DSCP value associated with the expedited forwarding PHB, the packet is forwarded with minimal delay or loss. By setting the DS field 122 with the DSCP value associated with the assured forwarding PHB, the packet receives better forwarding reliability than the traditional best efforts service. DS-compliant nodes typically establish special queues and/or employ queue selection strategies, such as Random Early Detection (RED), Random Early Detection with In and Out (RIO), etc., to achieve the forwarding requirements of the various PHBs.

The DS field 122 is typically loaded by DS compliant intermediate devices located at the border of a DS domain, which is a set of DS compliant intermediate devices under common network administration. Thereafter, interior DS compliant devices along the path examine the DS field 122 of received packets and apply the corresponding forwarding behavior to them.

Figure 1C:
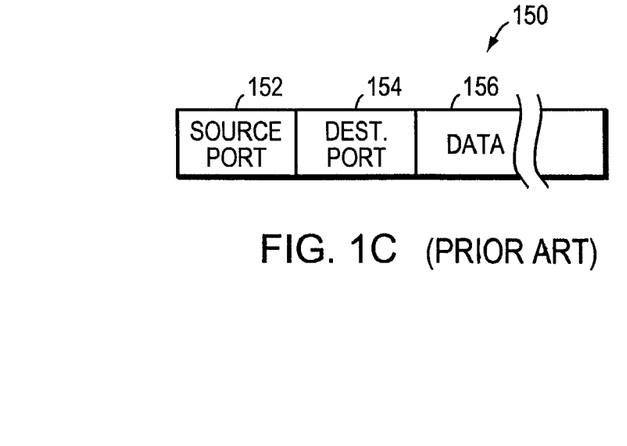

FIG. 1C is a partial block diagram of a Transport Layer packet 150. In the TCP/IP Reference Model, the transport layer corresponds to the Transmission Control Protocol (TCP) or the User Datagram Protocol (UDP). The transport layer packet 150 preferably includes a source port field 152, a destination port field 154 and a data field 156, among others. Fields 152 and 154 are preferably loaded with the predefined or dynamically agreed-upon TCP or UDP port numbers being utilized by the corresponding network entities. A TCP or UDP packet 150 is typically encapsulated within an IP packet 120 by placing it in the data portion 130 of the IP packet 120. The IP packet 120, in turn, is encapsulated in the data portion 106 of a Data Link frame 100 for transmission across a computer link.

The Resource Reservation Protocol

As set forth above, to support streaming multimedia applications, the corresponding content must typically be delivered within specific, fixed time constraints and without jitter. Although many computer networks have the resources and services to meet the delivery requirements of streaming multimedia, these resources and services must be allocated, preferably in advance, to the correct network traffic. The Resource reSerVation Protocol (RSVP), which is set forth at RFC 2205, was developed so that entities (typically referred to as receivers) could reserve bandwidth within their computer networks to receive a desired traffic flow from one or more sourcing entities. Pursuant to RSVP, sources send RSVP Path messages identifying themselves and indicating the bandwidth needed to receive their programming or content. If a receiver is interested in the programming or content offered by a particular source, it responds with a RSVP Reservation (Resv) message, which travels hop-by-hop back to the source. At each hop, the corresponding intermediate device establishes a session for the receiver and sets aside the requested bandwidth for the desired traffic flow. With RSVP, traffic corresponding to streaming multimedia content can be accorded the resources and services it needs to ensure timely, jitter-free delivery.

Many network servers, including multimedia servers, however, do not include RSVP facilities. As a result, the bandwidth needed to support the content residing on these servers cannot be reserved in the computer networks which connect these servers to potential receivers. The quality of the presentations of this content may thus be substantially degraded.

SUMMARY OF THE INVENTION

Briefly, the invention relates to a Resource reSerVation Protocol (RSVP) transmitter proxy for use on behalf of a network entity, such as a multimedia server, that lacks RSVP facilities of its own. The RSVP transmitter proxy is preferably disposed in an intermediate network device that is proximate to (e.g., one hop away from) the respective server. In addition to the RSVP transmitter proxy, the network device further includes a classification engine configured to identify network traffic passing through the network device, and a media session manager for maintaining state and other information for sessions being provided by the server. The network device may also include an admission control engine.

In accordance with the invention, the classification engine examines the network traffic destined for the multimedia server and identifies client requests seeking to initiate a multimedia session. These requests may be in the form of Real Time Streaming Protocol (RTSP) messages containing Session Description Protocol (SDP) files, and the classification engine is specially configured to snoop such messages. Traffic flow information for the session, such as source and destination addresses and ports and a description of the traffic characteristics of the expected multimedia stream from the server, is passed to the RSVP transmitter proxy. Using this snooped information, the RSVP transmitter proxy, on behalf of the server, generates and sends an RSVP Path message to the client. The Path message is specifically configured by the RSVP transmitter proxy to appear as though it had been generated and sent by the multimedia server. The Path message traverses the same route through the computer network that the data packets will follow and is received by the client. At each intermediate node, the information from the Path message is used to establish path state should a subsequent reservation be made.

Assuming it is interested in the session, the client responds to the "server" with an RSVP Resv message that contains admission control and traffic flow parameters based upon those contained in the Path message from the RSVP transmitter proxy. Based on the previously established path state at each node, the RSVP Resv message follows the same route through the computer network as the Path message although in the opposite direction. The intermediate network devices disposed along the route examine the traffic flow parameters contained within the RSVP Resv message and reserve sufficient local resources to support the session. The Resv message is intercepted by the RSVP transmitter proxy before reaching the multimedia server, which would be unable to process it. The intermediate device containing the RSVP transmitter proxy similarly reserves sufficient resources for the anticipated flow. As a result, bandwidth in the computer network can be reserved for streaming sessions originating from the multimedia server, even though the server itself does not support the RSVP protocol.

In a further embodiment of the present invention, the RSVP transmitter proxy may also select one or more admission control parameters, such as a Differentiated Services Codepoint (DSCP) that is to be applied to a session originating from the multimedia server. The selected DSCP is preferably inserted into the RSVP Path message generated and sent by the RSVP transmitter proxy. Intermediate devices along the route to the client examine the DSCP assigned by the RSVP transmitter proxy and may use it to perform local admission control decisions to determine whether the resources and/or services necessary to satisfy the treatment specified by the DSCP can be allocated.

BRIEF DESCRIPTION OF THE DRAWINGS

The invention description below refers to the accompanying drawings, of which.

DETAILED DESCRIPTION OF AN ILLUSTRATIVE EMBODIMENT

Figure 2:
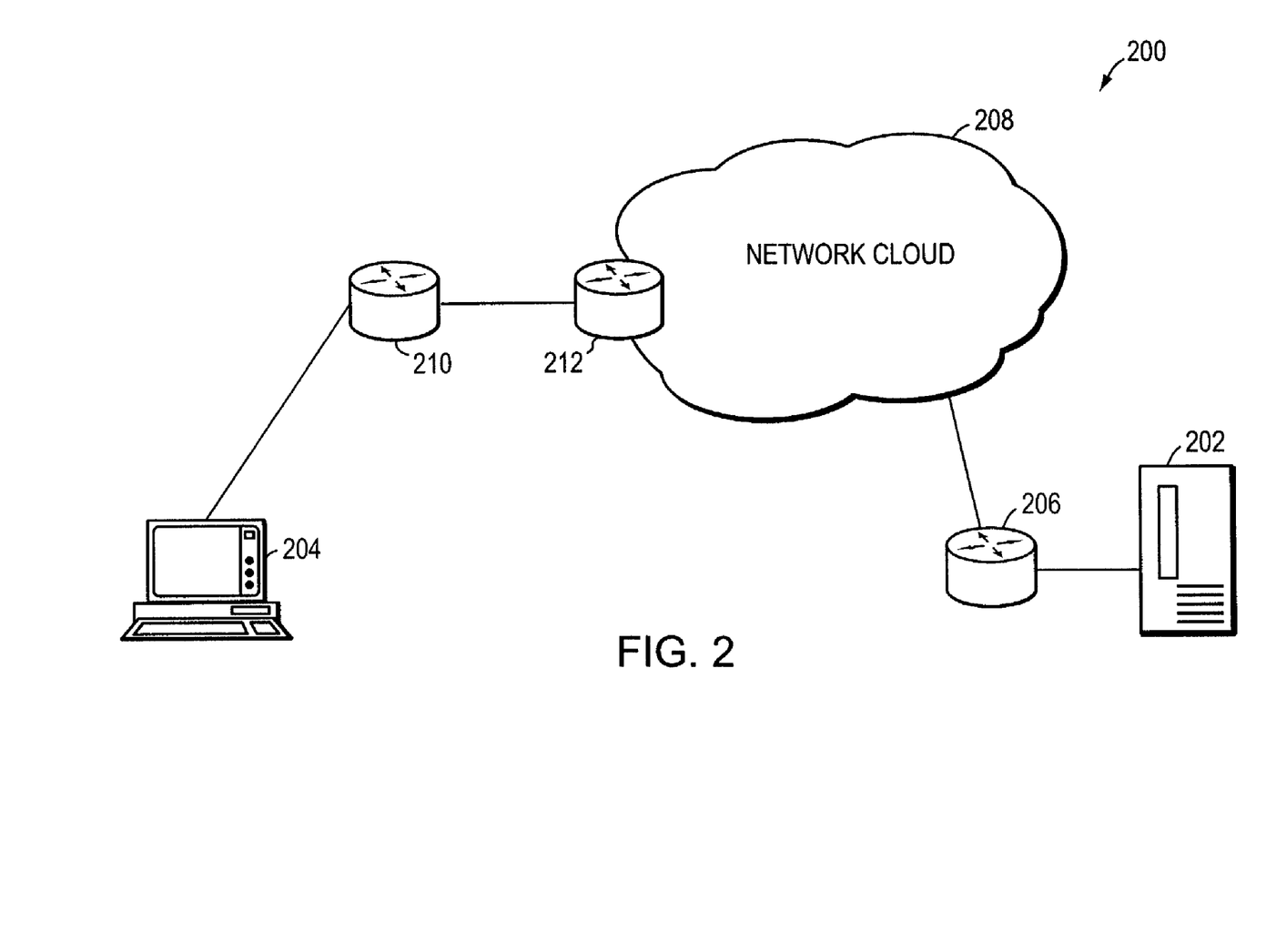
FIG. 2 is a highly schematic block diagram of a computer network.

FIG. 2 is a highly schematic block diagram of a computer network 200. The network 200 includes a multimedia server 202 and a client entity 204 that are interconnected by a plurality of intermediate network devices. More specifically, server 202 is coupled to a first hop network device, such as router 206, which, in turn, is coupled to a network cloud 208. The network cloud 208 may consist of a plurality of network devices, local area networks (LANs), and end stations. Client entity 204 is similarly coupled to a first hop network device, such as router 210, which, in turn, is coupled to network cloud 208. More specifically, router 210 is coupled to an edge or border device of network cloud 208, such as edge router 212. Edge router 212 represents an ingress/egress point for network cloud 208.

Multimedia server 202 preferably has a plurality of accessible files, including one or more continuous media files that can be streamed to clients, such as client 204. Alternatively, multimedia server 202 may be configured to support videoconferencing, white board applications and/or live "webcasts". The continuous media files, videoconferences or webcasts are all time-sensitive and must be reproduced at the client 204 within the same timing relationship that existed at the server 202. The continuous media files, videoconferences or webcasts may each include one or more audio and/or video streams, which either alone or together with other media streams represent a complete presentation. Multimedia server 202 preferably includes facilities, such as software, hardware and/or firmware, for operating in accordance with the Real-time Transport Protocol (RTP) as set forth at Request for Comments (RFC) 1889, the Real-Time Streaming Protocol (RTSP) as set forth at RFC 2326, and the Session Description Protocol (SDP) as set forth at RFC 2327, which are each hereby incorporated by reference in their entirety.

Network cloud 208 preferably represents the infrastructure and facilities of an Internet Services Provider (ISP). ISPs are enterprises who have built sophisticated communication infrastructures and facilities, which are then used by other organizations, such as corporations, educational institutions, and governmental entities, for connecting to the well-known Internet. The infrastructures and facilities of one or more ISPs may also be used to provide connectivity between geographically remote facilities of an organization so as to form a virtual private network (VPN) or intranet for that organization. These organizations typically enter into service level agreements (SLAS) with the ISPs, which include one or more traffic specifiers. The traffic specifiers typically place limits on the amount of resources that the subscribing organization will consume for a given charge. For example, an organization, which typically includes many network entities or end stations, such as client 204, may agree not to send and/or receive traffic that exceeds a certain bandwidth (e.g., 1 Mb/s).

Traffic exiting and entering the ISP's network to and from the organization's network is monitored (i.e., "policed") to ensure that it complies with the relevant traffic specifiers, and is thus "in-profile". Traffic that exceeds a traffic specifier (i.e., traffic that is "out-of-profile") may be dropped or shaped by the ISP or it may result in an accounting change (i.e., causing the subscribing organization to be charged a higher rate). Alternatively, out-of-profile traffic can be marked as exceeding one or more traffic specifiers, but nonetheless allow it to proceed through the network. If there is congestion, the ISP may drop such "marked" traffic first in an effort to relieve the congestion. The policing, shaping, dropping and marking of network traffic may be performed by one or more intermediate network devices under the ISP's control, such as edge router 212.

Figure 3:
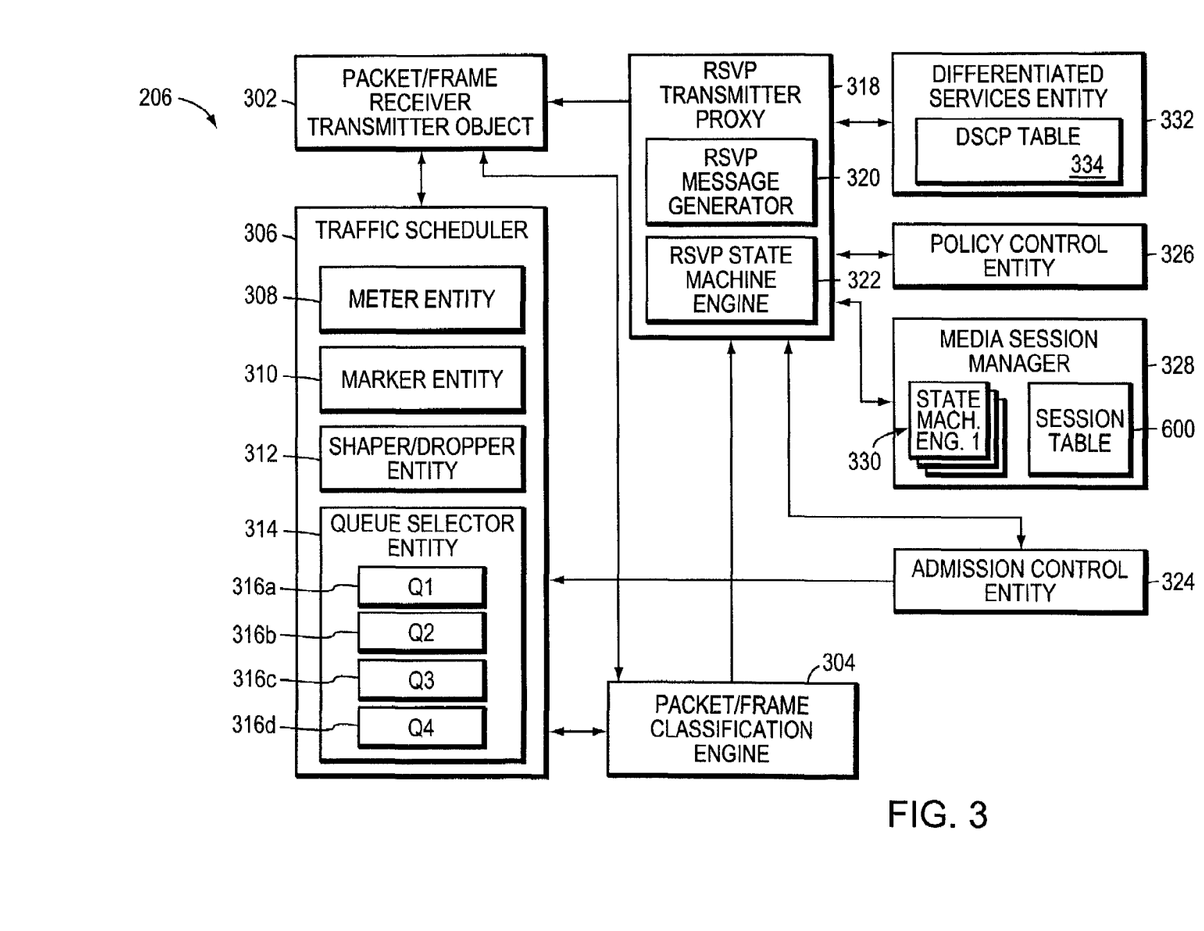
FIG. 3 is a highly schematic block diagram of an intermediate network device in accordance with the present invention.

FIG. 3 is a highly schematic, partial, functional block diagram of a router in accordance with the present invention, such as router 206, which is the first hop router from multimedia server 202. Router 206 preferably includes a packet/frame receiver transmitter object 302, a packet/frame classification engine 304, and a traffic scheduler 306. The traffic scheduler 306 includes a plurality of resources or services that are used by router 206 to forward packets. For example, scheduler 306 may include one or more metering entities 308, one or more marker entities 310, one or more shaper/dropper entities 312, and one or more queue selector entities 314. The queue selector entity 314, moreover, includes or has access to a plurality of queues 316a-d which store packets for the interfaces and/or ports that have been configured at router 206. The packet/frame receiver transmitter object 302 is configured to receive and send network messages for router 206. The packet/frame receiver transmitter object 302, the packet frame classification engine 304 and the traffic control engine 306 are all in communicating relationship with each other so that network messages as well as commands may be exchanged among them.

In accordance with the present invention, router 206 further includes a Resource reSerVation Protocol (RSVP) transmitter proxy 318. The RSVP transmitter proxy 318 includes an RSVP message generator 320 and an RSVP state machine engine 322. Router 206 also includes an admission control entity 324, a policy control entity 326, and a media session manager 328 having a session table 600 and a plurality of state machine engines 330 that can be configured to store information and maintain state for various media sessions with which the RSVP transmitter proxy 318 is involved. Router 206 may further include a differentiated services (DiffServ) entity 332 having one or more tables, such as table 334, for mapping the bandwidth requirements of network traffic sessions to the differentiated services codepoints (DSCPs) established in accordance with one or more service level agreements (SLAs). The RSVP transmitter proxy 318 operates substantially in accordance with at least part of the RSVP specification standard, which is set forth at RFC 2205 and is hereby incorporated by reference in its entirety.

A suitable platform for router 206 is the 7100 and 7200 series of routers from Cisco Systems, Inc. of San Jose, Calif. A suitable packet/frame classification engine 304, moreover, is the Network-Based Application Recognition (NBAR) facility of the Internetwork Operating System (IOS) from Cisco Systems, Inc.

Figure 4A:
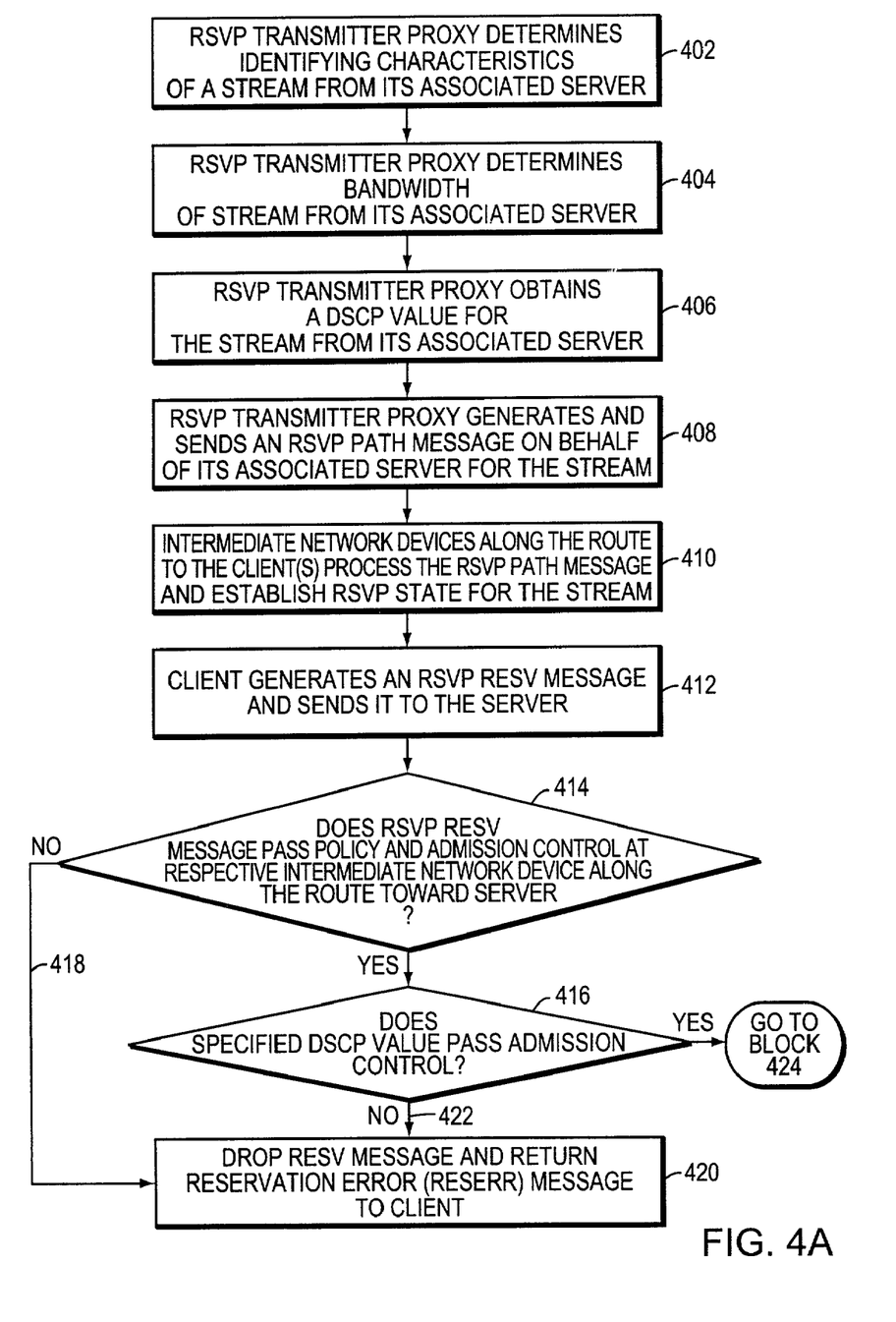
FIGS. 4A-B are flow diagrams in accordance with a preferred embodiment of the method of the present invention.
Figure 4B:
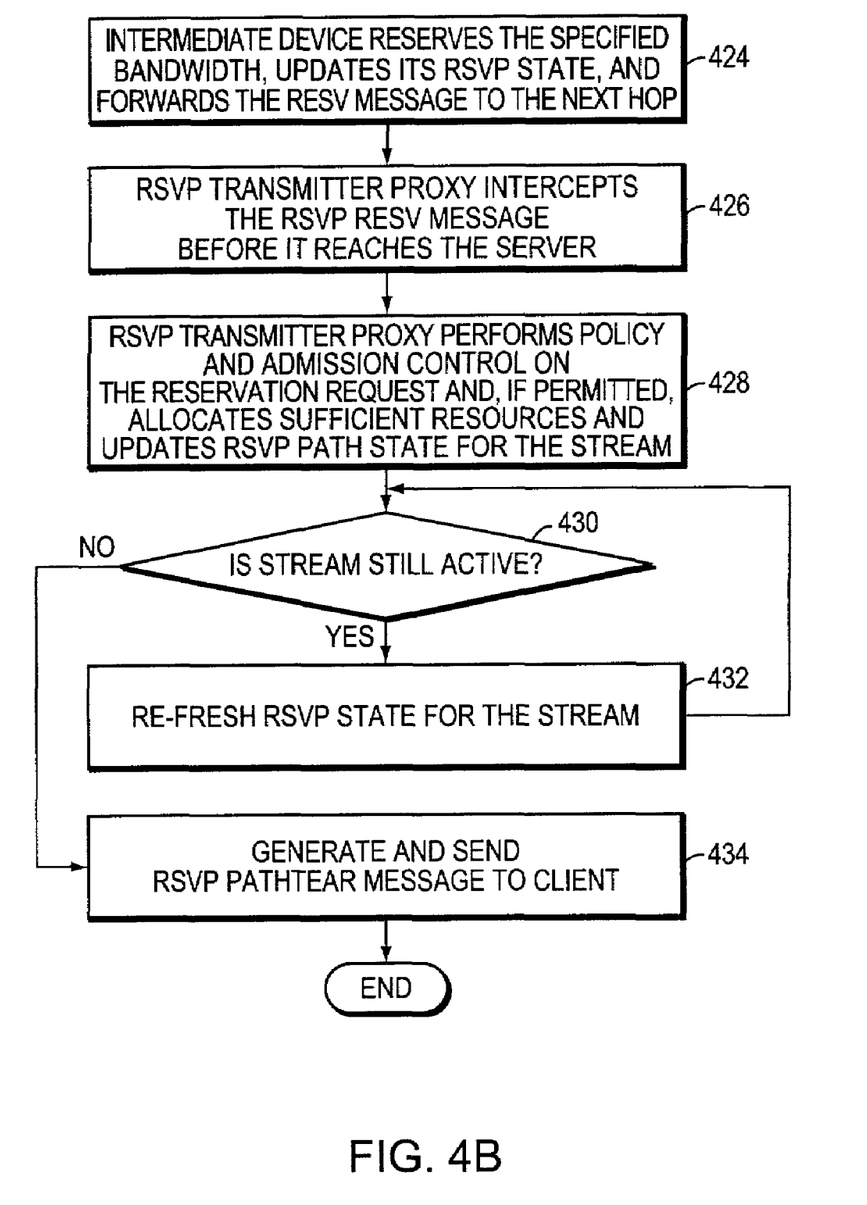

FIGS. 4A-B are a flow diagram of the method of the present invention. First, the RSVP transmitter proxy 318 obtains sufficient information regarding a proposed stream between multimedia server 202 and a client, such as client 204, to identify the traffic flow, as indicated at block 402. Preferably, the RSVP transmitter proxy 318 determines the source and destination IP addresses, the source and destination transport layer port numbers, and the transport layer protocol, e.g., TCP, UDP, etc. for the traffic flow. The RSVP transmitter proxy 318 also obtains and the bandwidth of the stream, as indicated at block 404.

In a preferred embodiment, the traffic flow and bandwidth information is obtained by snooping on RTSP traffic between the server 202 and the client 204. More specifically, a client, such as client 204, may generate and send an RTSP Describe Request message to the multimedia server 202 in order to obtain information about a particular stream or session that is supported by server 202 and of interest to client 204. RTSP uses a message format that is similar to the Hypertext Transport Protocol (HTTP), which is wellknown to those skilled in the art. First, the client 204 may establish a transport layer, e.g., TCP, connection with the multimedia server 202 in a conventional manner. Once the TCP connection is established, the client 204 sends the RTSP Describe Request message, which typically contains the Uniform Resource Identifier (URI) for the session or stream of interest to the client 204.

Figure 5A:
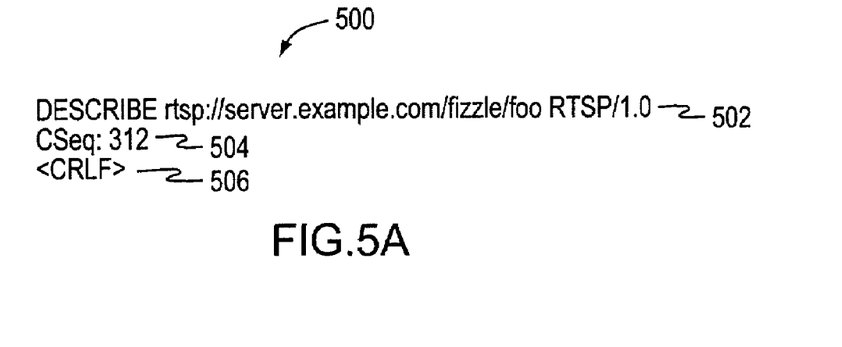
FIGS. 5A-D are highly schematic representations of RTSP messages.

FIG. 5A illustrates an exemplary RTSP Describe Request message 500. Like HTTP, RTSP messages, including message 500, are organized as a series of lines separated by carriage returns (CRs). In particular, RTSP messages typically include an initial line, zero, one or more header lines, a blank line, i.e., a carriage return/line feed (CRLF) by itself, and an optional message body. In an initial line 502, message 500 specifies the respective RTSP message type, e.g., DESCRIBE. The initial line 502 also contains the URI of the presentation or of the individual stream or streams that make up or are part of the presentation of interest. Message 500 further includes a second header line 504 that specifies a CSeq value. As provided in the RTSP specification standard, a CSeq value is a sequence number used to match RTSP request-response message pairs. Message 500 also includes a blank line 506. The RTSP Describe Request message 500 does not have a message body. Message 500 travels through routers 210 and 212, which sends the message 500 through network cloud 208. Message 500 is forwarded to router 206, which, in turn, passes it to multimedia server 202.

Figure 5B:
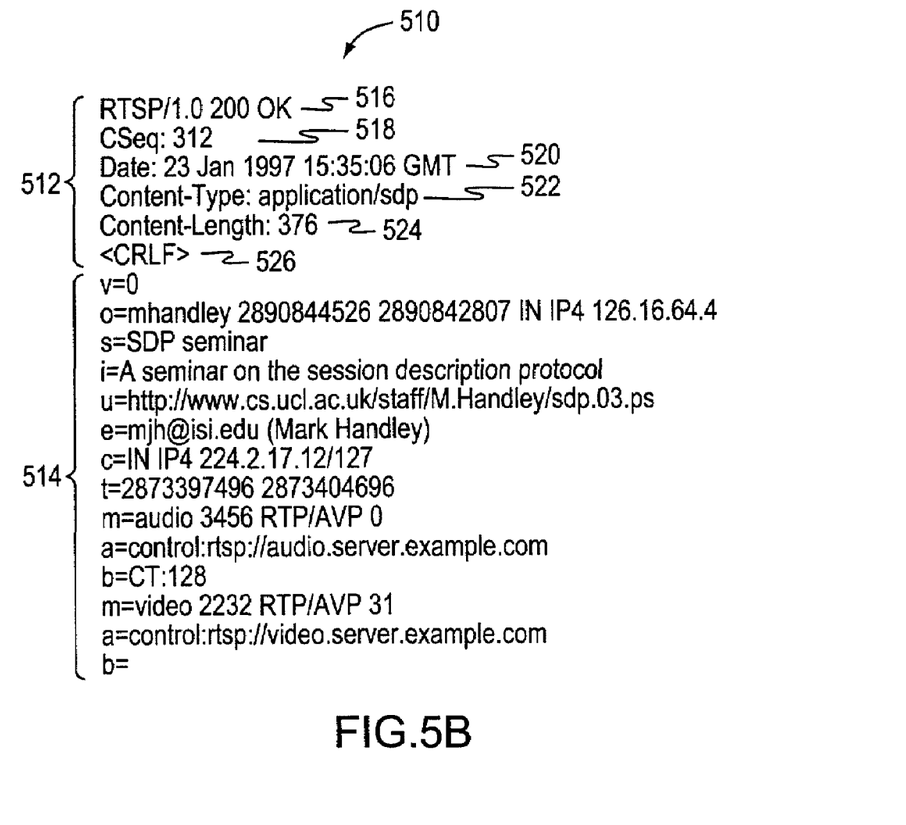

Multimedia server 202, which includes RTSP facilities, examines the message 500 and searches its files for the specified presentation or stream. Assuming the presentation or stream identified by the Describe Request message's URI is at the multimedia server 202, it responds with an RTSP Describe Response message. FIG. 5B illustrates an exemplary RTSP Describe Response message 510. Message 510 includes a header 512 and a message body 514. The header 512 includes an initial response line 516 that, like HTTP, is a status line, where the value "200" indicates that the request succeeded. A second header line 518 contains the same CSeq value as the request message 500 so that this response 510 can be matched up with request message 500. A third header line 520 contains the date. A fourth header line 522 specifies the format type of the stream or session description included in the message body 514. In this case, the description is in Session Description Protocol (SDP) format. A fifth header line 524 specifies the length of the attached presentation description, and a blank line 526 separates the header 512 from the message body 514.

The message body 514 contains a description of the specified presentation in SDP format. An SDP description file consists of a series of lines of text of the form: <type>=<value>. Three required types "v", "o" and "s" specify the protocol version, the owner and the session's name, respectively. The remaining types are optional. The "i" type specifies session information. The "u" type specifies a URL where more information about the session may be obtained, the "e" type specifies the email address of a contact person, the "c" type specifies connection information, e.g., a multicast IP address and time-to-live (TTL), the "b" type specifies bandwidth information for the respective presentation or stream, the "t" type specifies the time the respective presentation or stream is active, such as a start time and stop time. For each media stream (e.g., first audio, second audio, first video, second video, etc.) that makes up the corresponding session or presentation, there is typically a "m" type, which specifies the respective media name, and one or more optional fields, including the "a" type, which specifies some attribute, such as receive only, of the respective media stream.

Here, the RTSP Describe Response message 510 specifies a bandwidth of "CT:128" which indicates that a bandwidth of 128 Kb/s is to assumed for the entire multimedia session, i.e., both the audio and the video streams.

Message 510 is sent by multimedia server 202 to the client 204. More specifically, the message 510 is forwarded to router 206 which sends it through network cloud 208. Message 510 is received at edge router 212 which forwards it to router 210. From here, the message 510 is passed to the client 204.

In accordance with the present invention, router 206 is configured to snoop RTSP messages sent to and originating from the multimedia server 202. More specifically, since router 206 is the last hop router for server 202, messages from client 204 that are addressed to the multimedia server 206 pass through router 206. These messages are examined by the packet/frame classification engine 304 before being forwarded on to server 202. Similarly, messages from multimedia server 206 that are addressed to client 204 (whether by unicast or multicast addresses) pass through router 206 and are also examined by the packet/frame classification engine 304 before being forwarded on their way to client 204.

More specifically, the TCP message 150 (FIG. 1C) containing the RTSP Describe Response message 510 is examined by the packet/frame classification engine 304. The classification engine 304 determines that the TCP message 150 is carrying an RTSP Describe Response message. The classification engine 304 examines the session description contained in the message body 514. It retrieves the IP address of the originating host, which is specified by the type "o" field, the session name, which is specified by the type "s" field, and the bandwidth for each media stream, which is specified by the type "b" field(s). This information is then passed to the RSVP transmitter proxy 318. The RSVP transmitter proxy 318 preferably passes the information to the media session manager 328 which creates an entry for the session in its session table 600 and activates at least one state machine engine 330 for the session.

Figure 6:
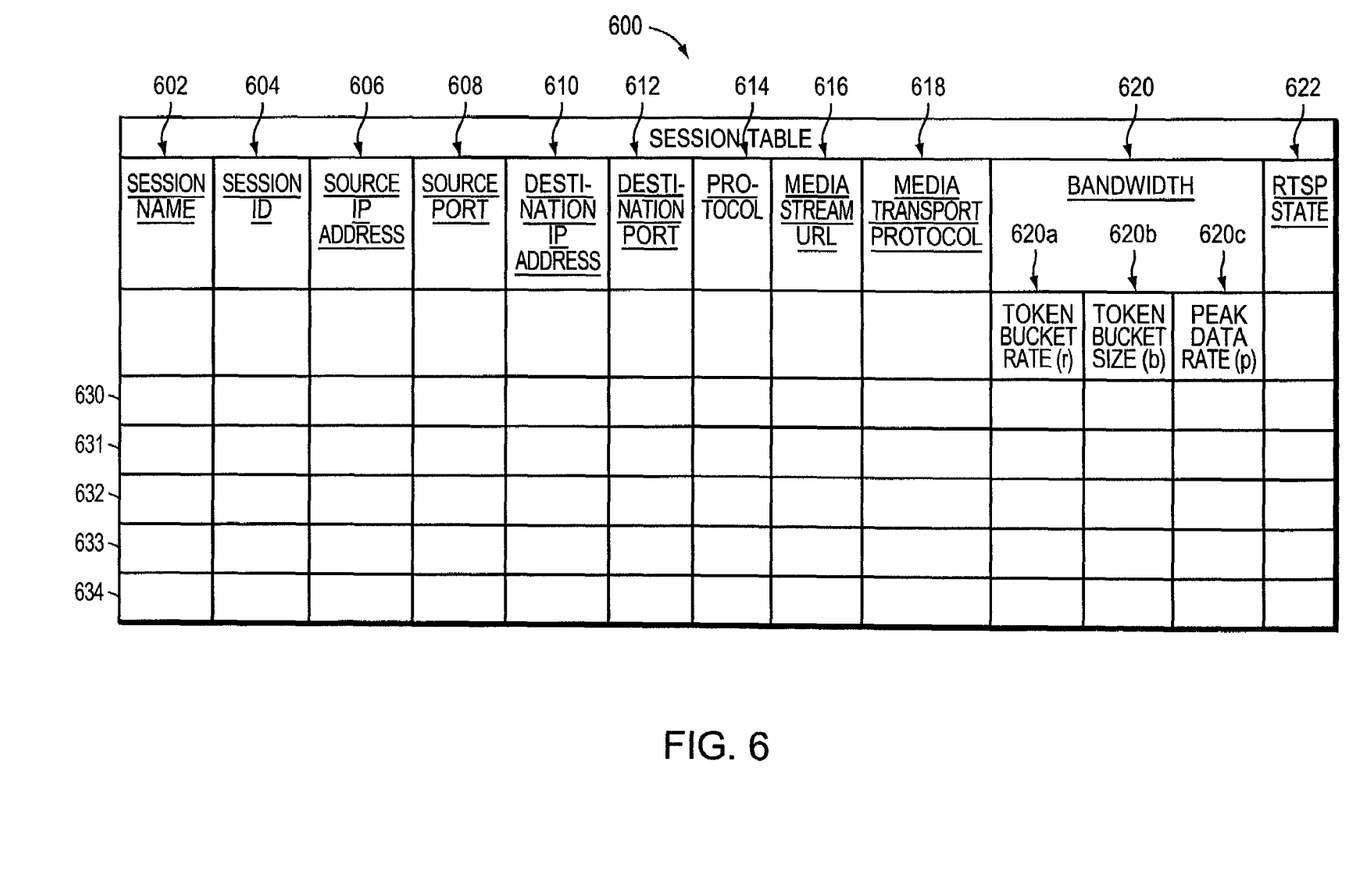
FIG. 6 is a highly schematic representation of a session table.

FIG. 6 is a highly schematic block diagram of a session table 600 maintained by the media session manager 328. Table 600 is preferably configured as an array having a plurality of columns 602-622 and rows 630-634 whose intersections define corresponding records or cells. Each row 630-634 contains information corresponding to a respective stream. In particular, a first column 602 lists the name of the corresponding session. A second column 604 contains the identifier (ID) for the session, while a third column 606 lists the IP address of the source of the session, e.g., the IP address of multimedia server 202. A fourth column 608 lists the source port of the session. A fifth column 610 lists the destination IP address for the session, which may be the client's unicast IP address or it may be a multicast address that has been assigned to the session. A sixth column 612 lists the destination port, while a seventh column 614 lists the transport layer protocol being used by the session, e.g., TCP, UDP, etc. An eighth column 616 lists the URI for the session, and a ninth column 618 identifies the media transport protocol, e.g. RTP. A tenth column 620 lists the session's bandwidth as provided in the RTSP Describe Response message. Tenth column 620 may be sub-divided into a plurality of sub-columns, such as sub-columns 620*a*, 620*b* and 620*c* for storing token bucket rate [r], token bucket size [b], and peak data rate [p] information. Tenth column 620 may be further configured to store additional information, such as minimum policed packet size [m], maximum packet size [M], etc. An eleventh column 622 lists the current RTSP state of the session as described below.

The media session 328 manager preferably loads the corresponding cells of the entry, e.g., entry 630, that has been established for this stream with the information received from the RSVP transmitter proxy 318. The conversion of SDP specified information into a format for storing at the session table 600 depends on the particular flowspec being used. Here, for example, the specified bandwidth, i.e., 128 Kb/s, is preferably used as the token bucket rate [r] value, while default values are utilized for the remaining parameters, e.g., token bucket size [b], peak data rate [p], etc. Manager 328 may have a store (not shown) of default values, which may vary depending on the type of stream, e.g., audio, video, etc. If the response message 510 does not include any bandwidth information, manager 328 may similarly load table 600 with default information.

Assuming the client 204, upon reviewing the session description information contained in the RTSP Describe Response message 510, is interested in receiving the corresponding stream or presentation, it next issues an RTSP Setup Request message for each stream that makes up the presentation. The Setup Request message basically contains the transport initialization information for the stream.

Figure 5C:
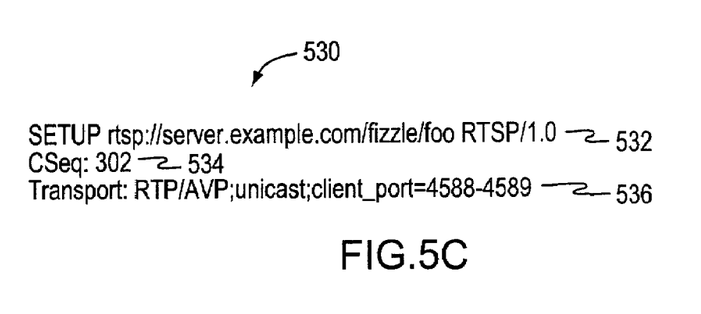

FIG. 5C is an exemplary RTSP Setup Request message 530. Message 530 includes an initial line 532 that specifies the type of RTSP message, e.g., Setup, and specifies the URI for the media stream to be established. A second header line 534 specifies the sequence number for use in matching the request message with a response from the server 202. It also includes a third header line 536 containing the transport initialization information. More specifically, header line 536 specifies a transport protocol, such as the Real-time Transport Protocol (RTP)/Audio Visual Profiles (AVP). It also specifies the transmission mode, such as unicast or multicast, and the client's port number or numbers to which the respective stream is to be directed. The RTSP Setup Request message 530 is routed to the multimedia server 202 which determines whether or not the transport initialization information from the client 204 is acceptable or not and, in either case, responds with an RTSP Setup Response message.

Figure 5D:
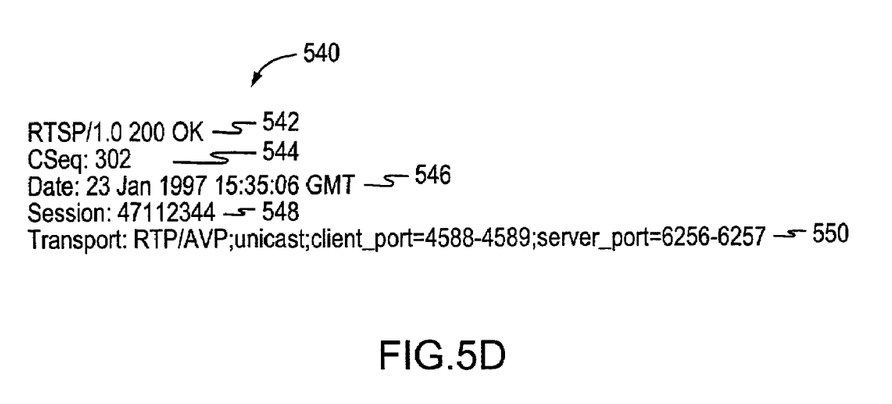

FIG. 5D is a highly schematic representation of an RTSP Setup Response message 540. It has a first header or status line 542 which may indicate that the RTSP Setup Request message 540 succeeded, i.e., it may include the code "200". A second header line 544 returns the same CSeq number to the client 204, and a third header line 546 may provide the date. A fourth header line 548 specifies the identifier for the session as selected by the multimedia server 202. A fifth header line 550 specifies the transport initialization information accepted by the server 202. More specifically, fifth line 550 notes that the transport protocol, RTP/AVP, and transmission mode, unicast, as suggested by the client 204 are acceptable to server 202. Fifth line 550 of message 540 also returns the client port number(s), e.g., 4588-4589, as a check, and specifies the server's port number(s), i.e., 6256-6257, for the stream or presentation.

Both of these messages 530, 540 are preferably captured by the server's first hop router 206 and examined by the packet/frame classification engine 304 which determines what types of messages they are, i.e., RTSP Setup Request and Response messages. From the Setup Request message 530, the packet/frame classification engine 304 extracts a copy of the URI for the session. From the Setup Response message 540, the packet/frame classification engine 304 extracts a copy of the session identifier (ID) and the client and server port numbers. This information is provided to the RSVP transmitter proxy 318, which passes it to the media session manager 328 for loading into the respective cells of the corresponding entry 630 of session table 600.

It should be understood that the packet/frame classification engine 304 and/or the RSVP transmitter proxy 318 may store at least temporarily the CSeq values of RTSP messages so that message pairs can be matched together. This allows the URI specified in the Setup Request message 530 to be matched with the right client and server port numbers, which are specified in the matching Setup Response message 540.

It should be further understood that other methods may be used to obtain the description of a stream or presentation, such as another protocol besides RTSP, e.g., HTTP, email applications, etc., or via command line or standard input helper applications.

It should also be understood that the packet/frame classification engine 304 may send information directly to the media session manager 328 or that the media session manager 328 may be incorporated within the RSVP transmitter proxy 318.

At this point, the RSVP transmitter proxy 318 "knows" among other things the "5-tuple traffic flow characteristics" for the stream or session, i.e., the source and destination IP addresses, the source and destination port numbers, and the transport layer protocol, e.g., TCP, UDP, etc. It also knows the URI and the bandwidth for the stream or session, among other things.

Next, the RSVP transmitter proxy 318 may select or otherwise obtain a Differentiated Services Codepoint (DSCP) for the identified stream or presentation, as indicated at block 406. As described below, the DSCP may be used to provide additional granularity in the admission control decision made by intermediate devices along the route to client 204. To obtain a DSCP, the RSVP transmitter proxy 318 may provide some identifying characteristics of the stream, such as the 5-tuple traffic flow characteristics, the bandwidth, whether the stream represents audio and/or video traffic, etc. to the DiffServ entity 332. The DiffServ entity 322 preferably performs a lookup on its DSCP table 334 to find the DSCP value matching the characteristics specified by the RSVP transmitter proxy 318. The matching DSCP is then returned to the RSVP transmitter proxy 318.

Using the DSCP value returned by the DiffServ entity 332 and the 5-tuple traffic characteristics of the stream, the RSVP transmitter proxy 318, as indicated at block 408, generates an RSVP Path message on behalf of the multimedia server 202 which, as described above, lacks RSVP facilities. The RSVP Path message preferably includes a plurality of objects, such as a session object, a sender template object, a sender Tspec object, and a DCLASS object. It may also include an adspec object.

Figure 7:
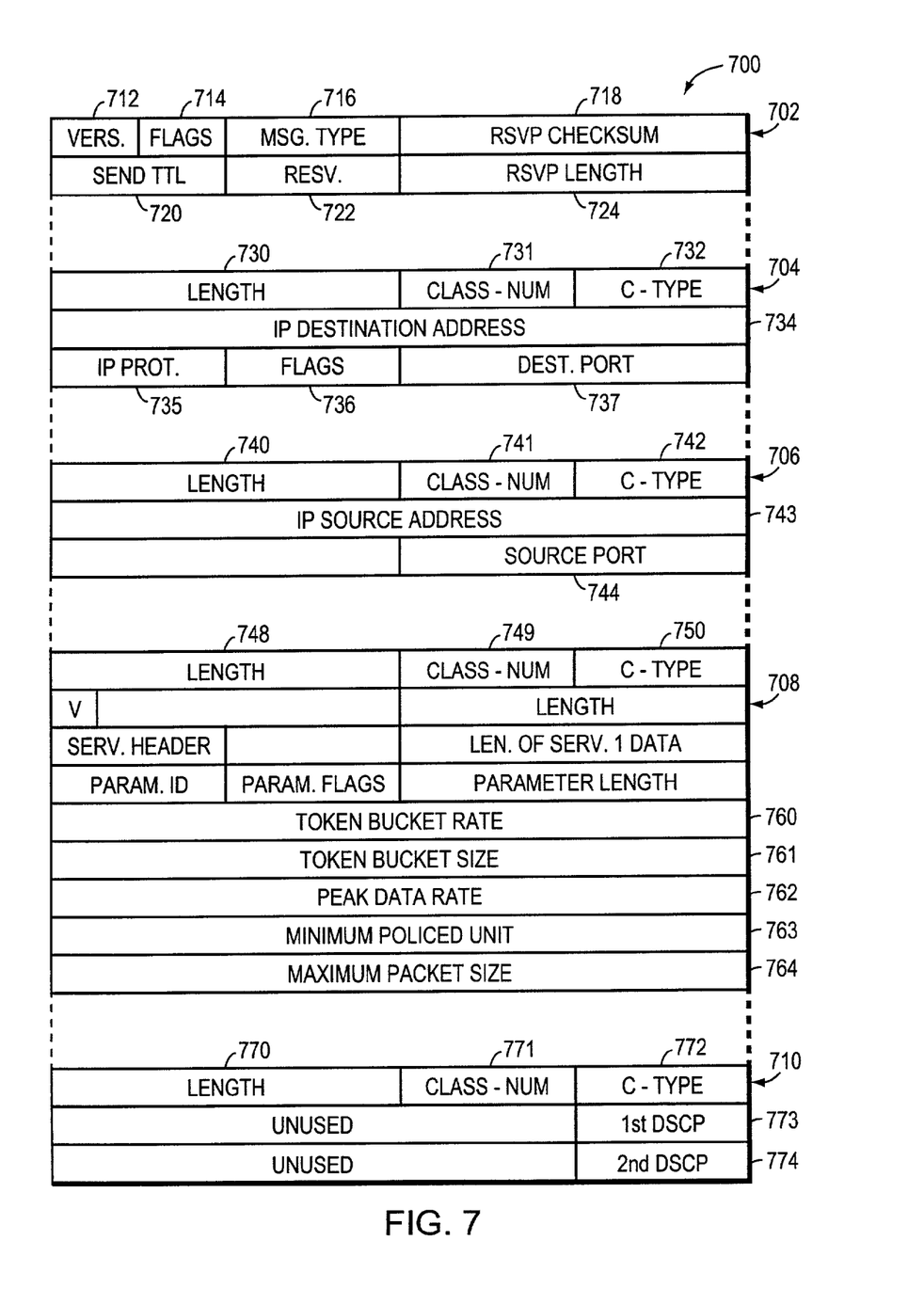
FIG. 7 is a highly schematic representation of an RSVP message.

FIG. 7 is a highly schematic block diagram of the RSVP Path message 700 generated by the RSVP transmitter proxy on behalf of multimedia server 202. The RSVP Path message 700 includes a header 702 and, as indicated above, a session object 704, a sender template object 706, a sender Tspec object 708 and a DCLASS object 710 each of which comprises a plurality of fields. More specifically, as provided in RFC 2205, the RSVP header 702 has a version field 712, a flags field 714, a message type field 716, an RSVP checksum field 718, a Send Time To Live (TTL) field 720, a reserved field 722 and an RSVP length field 724. Fields 712-724 are preferably loaded in a conventional manner.

The session object 704 has a length field 730 (loaded with the length of the respective object), a class number field (C-Num) 731 and a class type (C-type) field 732. It further includes an IP destination address (DA) field 734, an IP protocol identifier field 735, a flags field 736, and a destination port number field 737. The sender template object 706 has a length field 740 (loaded with the length of the respective object), a class number field (C-Num) 741 and a class type (C-type) field 742. It further includes an IP source address (SA) field 743, a source port number field 744 and may include one or more un-used fields. The sender Tspec object 708 also includes length 748, class number 749 and class type 750 fields. It further includes a token bucket rate field 760, a token bucket size field 761, a peak data rate field 762, a minimum policed unit field 763 and a maximum packet size field 764, among others. The DCLASS object 710 similarly includes length 770, class number 771 and class type 772 fields. It also includes one or more DSCP fields, such as first and second DSCP fields 773 and 774, which are each used to carry a DSCP value.

The RSVP transmitter proxy 318 loads the RSVP Path message 700 with the 5-tuple traffic characteristics that it identified for the stream. More specifically, the IP destination address and destination port(s) for client 204 are loaded into fields 734 and 737. The transport layer protocol is loaded into field 735. The IP source address and source port(s) for server 202 are loaded into fields 743 and 744 of the sender template object 706. The token bucket rate, token bucket size and peak data rate as determined from the SDP file for the stream are loaded into fields 760-762 of the sender Tspec object 708. The DSCP value returned by the DiffServ entity 332 is loaded into one of the DSCP fields, e.g., first DSCP field 773, of the DCLASS object 710. The remaining fields of the RSVP Path 700 message are preferably loaded in a conventional manner.

Router 206, on behalf of server 202, then sends the RSVP Path message 700 to client 204. The RSVP Path message 700, which runs directly over the Internet Protocol, is examined by each intermediate device along the route from router 206 to client 204 that supports RSVP, including routers 210, 212 and one or more intermediate devices located in the network cloud 208. At each hop, the intermediate device processes the RSVP Path message 700 by installing RSVP path state information regarding the pending reservation request, as indicated at block 410. This information includes the IP address and destination port from session object 704 and the IP address and source port of the multimedia server 202 from the sender template object 706. In the preferred embodiment, the intermediate device also stores the DSCP value from the DCLASS object 710.

The RSVP Path message 700 is eventually received by client 204 and/or its proxy. Assuming the client 204 wants to have resources reserved to support the session, it responds with an RSVP Reservation (Resv) message, as indicated at block 412. The RSVP Resv message contains a session object, which is similar to session object 704, a filter spec object, which is similar to sender template object 706, and a flowspec object, which is similar to the sender Tspec object 708. The session object of the Resv message contains the IP destination address and transport layer destination port(s) for client 204, as described above in connection with session object 704. The filter spec object is loaded with the IP source address and source port(s) for the multimedia server 202. The flowspec object specifies the resources, e.g., the bandwidth, that the client 204 requests to be reserved for the stream from multimedia server 202. Specifically, the client 204 loads the flowspec object with the bandwidth that it requests in support of the stream and/or session with the multimedia server 202. Specifically, the client 204 enters a token bucket rate, a token bucket size and a peak data rate into the flowspec object. The bandwidth requested by the client 204 is typically the bandwidth that was recommended by the multimedia server 202 in the sender Tspec object 708. However, the client 204 may request a different bandwidth.

Client 204 sends the RSVP Resv message to the multimedia server 202 hop-by-hop. That is, the Resv message is first addressed and sent to router 210, which processes it. Router 210 as well as router 212, in addition to having their own RSVP facilities, also include policy control and admission control entities. When the RSVP Resv message is received at router 210, it is passed to the router's RSVP facilities for processing. The RSVP facilities first match up the request of the Resv message with the RSVP state that was installed in response to the RSVP Path message 700 from router 206. Then, using the contents of the session and filter spec objects, the RSVP facilities at router 210 query the policy control entity to determine whether the user, e.g., client 204, has administrative permission to make the reservation specified in the RSVP Resv message, as indicated at decision block 414. The RSVP facilities also use the contents of the flowspec object to query the admission control entity to determine whether router 210 has sufficient available resources to support the requested reservation, as also indicated at block 414.

In performing the admission control determination, one or more network devices along the route to client 204 may utilize the DSCP value from DCLASS object 710 as well as the bandwidth information from the flowspec object, as indicated at decision block 416. Suppose, for example, that the network that includes client 204 and router 210 has entered into an SLA with network cloud 208. Suppose further that this SLA provides that traffic carrying a particular DSCP value is limited to some predefined bandwidth, e.g., 100 Kbps. When the RSVP Resv message is received at edge router 212, the admission control entity utilizes not only the bandwidth specified in the reservation request, but also the DSCP value that was specified in the DCLASS object 710 of the corresponding Path message 700 to make a decision as to whether the reservation request passes admission control. That is, even though the resources available at the network device, e.g., number of priority queues, queue selection strategy, speed of link, etc., are sufficient to satisfy the reservation request, other streams using the same DSCP value may have already reserved all of the resources that can permissibly be allocated to this DSCP value.

If the requested reservation fails to pass policy and/or admission control at any given intermediate device along the route to server 202, the Resv message is dropped and a RSVP Reservation Error (ResvErr) message is returned to the client 204, as indicated by No arrow 418 leading to block 420. The ResvErr message informs client 204 that the reservation request has failed. Client 204 may then decide whether or not to go forward with the presentation knowing that sufficient resources have not been reserved in advance. Similarly, if the specified DSCP will not support the bandwidth requested by client 204, the respective device drops the Resv message and returns a ResvErr message to client, as indicated by No arrow 422 which also leads to block 420.

Assuming the reservation request represented by the RSVP Resv message passes both the policy and admission control entities, and the DSCP value, if tested, passes admission control, the respective intermediate device, e.g., router 210, reserves the requested resources, updates the RSVP path state for the anticipated traffic and forwards the RSVP Resv message to the next device on the route toward the server 202, as indicated at block 424 (FIG. 4B). The RSVP Resv message is thus propagated hop-by-hop toward the server 202. At router 206, the Resv message is intercepted, as indicated at block 426. In particular, the packet/frame classification engine 304 determines that it is an RSVP Resv message and, accordingly, forwards it to the RSVP transmitter proxy 318 for processing. The RSVP transmitter proxy 318 parses the Resv message.

Specifically, the RSVP transmitter proxy 318 examines the session, flowspec and filter spec objects, and performs its own policy and admission control evaluation and passes this information to the RSVP state machine engine 322 so that it may update the RSVP state established for this session, as indicated at block 428. The RSVP transmitter proxy 318 also programs or directs the packet/frame classification engine 304 to look for messages matching the traffic flow characteristics for this session. More specifically, it provides the packet/frame classification engine 304 with the 5-tuple traffic characteristics which are used by the packet/frame classification engine 304 to search network traffic received at router 206. The RSVP transmitter proxy 318 also directs the traffic scheduler 306 to apply the resources necessary to provide the bandwidth requested in the flowspec object from the RSVP Resv message to the network traffic matching the specified 5-tuple traffic characteristics. Because the associated RSVP Path message 700 was issued by router 206 on behalf of server 202, the RSVP transmitter proxy 318 does not forward the RSVP Resv message to server 202. Instead, the RSVP Resv message is terminated at router 206, as also indicated by block 426.

To start the session, the client 204 preferably issues an RTSP Play Request message to the multimedia server 202. The multimedia server 202 responds with an RTSP Play Response message and then begins streaming the session to the client 204 through a plurality of packets generated by the multimedia server 202. These packets travel along the route established by the RSVP Path and Resv messages through network 100 and thus receive the resources reserved for the stream or session by the intermediate devices disposed along this route. Router 206 may snoop the RTSP Play Request and Play Response messages exchanged between client 204 and router 202, and update the RTSP state stored at column 622 for this entry 630. In particular, it may transition the RTSP state from "ready" to "playing".

To the extent a DSCP value was obtained by the RSVP transmitter proxy 318, this value is preferably loaded into DS field 122 (FIG. 1B) of packets carrying the stream. DS field 122 may be loaded by server 202 or by router 206. That is, router 202 may notify server 202 of the DSCP value that was obtained, and server 202 may load this value into DS field 122.

The RSVP transmitter proxy 318 monitors the RTSP state to determine whether resources reserved pursuant to the Path and Resv messages should remain allocated to the stream, as indicated at decision block 430. In other words, the router 206 monitors RTSP messages to see whether the stream or session is still active. Assuming the stream is still active, RSVP transmitter proxy 318 periodically refreshes the RSVP path state for the stream, as indicated at block 432. More specifically, to maintain the reservation of resources allocated to the stream or session, the RSVP transmitter proxy 318 periodically issues new RSVP Path messages 700 to client 204. As described above, these Path messages are processed by the RSVP-aware intermediate devices as they travel along the route and to the client 204. Client 204 responds with an RSVP Resv message. The Resv message keeps the RSVP path states established by the intermediate devices from timingout which could result in a deallocation of the resources initially reserved for the stream or session.

When the client 204 has completed viewing and/or listening to the stream or session from multimedia server 202, it preferably issues one or more RTSP Teardown Request messages to the server 202, and server 202 responds with an acknowledgement. The packet/frame classification engine 304 at router 206 is preferably configured to snoop such messages and to forward copies to the RSVP transmitter proxy 318. In response to an RTSP Teardown Request message and an acknowledgement, the RSVP transmitter proxy 318 changes the RTSP state stored at column 622 for this entry 630, thereby indicating that the stream is no longer active. In response to the stream becoming inactive, the RSVP transmitter proxy 318 issues an RSVP PathTear message to the client 204, as indicated at block 426. The client 204 may respond with an RSVP ResvTear message, thereby causing the intermediate devices along the route to server 202 to deallocate the resources that had been reserved for the stream. Alternatively, the RSVP transmitter proxy 318 may simply stop issuing periodic RSVP Path messages, thereby causing the corresponding RSVP path states to time out.

The foregoing description has been directed to specific embodiments of this invention. It will be apparent, however, that other variations and modifications may be made to the described embodiments, with the attainment of some or all of their advantages. Therefore, it is an object of the appended claims to cover all such variations and modifications as come within the true spirit and scope of the invention.

What is claimed is:

1. A method for operating a router, comprising:
   receiving a first message from a client, the first message directed to a server to request a traffic flow from the server to the client;
   determining a sequence number of the first message;
   reading a second message from the server in order to determine if the message is a response to the first message, and determining if the second message is a response to the first message by checking a sequence number in the second message;
   reading from the first message and the second message at least one parameter of the traffic flow, the traffic flow requested by the client for the server to transmit to the client;
   writing the at least one parameter into a resource reservation request message (RSVP request message);
   transmitting, in response to the second message, the RSVP request message to the client, the RSVP message establishing a path to the client;
   receiving a RSVP reply message from the client, the RSVP reply message reserving resources for the requested traffic flow;
   receiving a data message of the traffic flow from the server; and
   transmitting the data message of the traffic flow with a resource reservation indicia in the data message, the resource reservation indicia to direct the data message to travel along the reserved resources.

2. The method of claim 1, further comprising:
   using a Resource reSerVation (RSVP) protocol to learn the contents of messages received by the router.

3. The method of claim 1, further comprising:
   connecting the router one hop away from the server.

4. A router, comprising:
   means for receiving a first message from a client, the first message directed to a server to request a traffic flow from the server to the client;
   means for determining a sequence number of the first message;
   means for reading a second message from the server in order to determine if the message is a response to the first message, and determining if the second message is a response to the first message by checking a sequence number in the second message;
   means for reading from the first message and the second message at least one parameter of the traffic flow, the traffic flow requested by the client for the server to transmit to the client;
   means for writing the at least one parameter into a resource reservation request message (RSVP request message);
   means for transmitting, in response to the message the RSVP request message to the client, the RSVP message establishing a path to the client;
   means for receiving a RSVP reply message from the client, the RSVP reply message reserving resources for the requested traffic flow;
   means for receiving a data message of the traffic flow from the server; and
   means for transmitting the data message of the traffic flow with a resource reservation indicia in the data message, the resource reservation indicia to direct the data message to travel along the reserved resources.

5. The router of claim 4, further comprising:
   means for using a Resource reSerVation (RSVP) protocol to learn the contents of messages received by the router.

6. The router of claim 4, further comprising:
   means for connecting the router one hop away from the server.

7. A method, comprising:
   receiving a first message from a client, the first message directed to a server to request a traffic flow stream from the server to the client;
   determining a sequence number of the first message;
   receiving a second message from the server;
   checking a sequence number in the second message to determine that the second message is a response to the first message;
   reading characteristics from the first message and the second message to identify the stream from the server to the client;
   snooping the second message to determine a bandwidth of the stream; and
   reserving resources within a computer network on behalf of the server for allocation to the stream.

8. The method of claim 7, further comprising:
   defining the first message as a Real Time Streaming Protocol (RTSP) request message.

9. The method of claim 7, further comprising:
   defining the second message as an RTSP response message.

10. A router, comprising:
    means for receiving a first message from a client, the first message directed to a server to request a traffic flow stream from the server to the client;
    means for determining a sequence number of the first message;
    means for receiving a second message from the server;
    means for checking a sequence number in the second message to determine that the second message is a response to the first message;
    means for reading characteristics from the first message and the second message to identify the stream from the server to the client;
    means for snooping the second message to determine a bandwidth of the stream; and
    means for reserving resources within a computer network on behalf of the server for allocation to the stream.

11. The router of claim 10, further comprising:
    means for defining the first message as a Real Time Streaming Protocol (RTSP) request message.

12. The router of claim 10, further comprising:
    means for defining the second message as an RTSP response message.

13. A router, comprising:
- a packet frame receiver configured to receive a first message from a client, the first message directed to a server to request a traffic flow stream from the server to the client;
- the packet frame receiver further configured to receive a second message from the server;
- a traffic scheduler configured to determine a sequence number of the first message, and to check a sequence number in the second message to determine that the second message is a response to the first message, and to read characteristics from the first message and the second message to identify the stream from the server to the client;
- a packet classification engine configured to snoop the second message to determine a bandwidth of the stream; and
- a resource reservation protocol (RSVP) transmitter proxy configured to reserve resources within a computer network on behalf of the server for allocation to the stream.

14. The router of claim 13, further comprising:
the first message is further defined as a Real Time Streaming Protocol (RTSP) request message.

15. The router of claim 13, further comprising:
the second message is further defined as an RTSP response message.

16. Software encoded in one or more computer readable media and when executed operable to:
- receive a first message from a client, the first message directed to a server to request a traffic flow stream from the server to the client;
- determine a sequence number of the first message;
- receive a second message from the server;
- determine that the second message is a response to the first message by comparison of a sequence number in the second message to the sequence number of the first message;
- read characteristics from the first message and the second message to identify the stream from the server to the client;
- determine a bandwidth of the stream; and
- reserve resources within a computer network on behalf of the server for the stream.

17. The router of claim 13, wherein the RSVP transmitter proxy is further configured to generate and send one or more RSVP Path messages on behalf of the server, the RSVP path messages containing the bandwidth of the stream.

18. The router of claim 17, wherein the one or more RSVP Path messages include a sender Tspec object containing the bandwidth of the stream.

19. The router of claim 13, wherein the RSVP transmitter proxy is further configured to terminate RSVP Reservation (Resv) messages that are sent to the server.

20. The router of claim 13, wherein the RSVP transmitter proxy is further configured to generate and send one or more RSVP Path Teardown messages on behalf of the server, to release the reserved resourced allocated to the stream.

21. The router of claim 13, wherein the characteristics comprise:
- a source address;
- a destination address;
- a source port number;
- a destination port numbers; and
- a transport layer protocol.

22. The router of claim 13, wherein the packet classification engine is further configured to interpret the second message according to Session Description Protocol (SDP).

23. The router of claim 13, further comprising:
a session manager configured to store the characteristics and the bandwidth of the stream.

24. The router of claim 13, wherein the RSVP transmitter proxy is further configured to select a Differentiated Services Codepoint (DSCP) value based on the bandwidth of the stream.

25. The router of claim 24, wherein the RSVP transmitter proxy is further configured to load the DSCP value into a RSVP Path message generated and sent on behalf of the server.

26. The method of claim 7, wherein the step of reserving resources within a computer network further comprises:
generating and sending one or more RSVP Path messages on behalf of the server, the one or more RSVP path messages containing the bandwidth of the stream.

27. The method of claim 26, wherein the one or more RSVP Path messages include a sender Tspec object containing the bandwidth of the stream.

28. The method of claim 7, further comprising:
terminating one or more RSVP Reservation (Resv) messages that are sent to the server.

29. The method of claim 7, further comprising:
generating and sending one or more RSVP Path Teardown messages on behalf of the server, to release the reserved resourced allocated to the stream.

30. The method of claim 7, wherein the characteristics comprise:
- a source address;
- a destination address;
- a source port number;
- a destination port numbers; and
- a transport layer protocol.

31. The method of claim 7, further comprising:
interpreting the second message according to Session Description Protocol (SDP).

32. The method of claim 7, further comprising:
storing the characteristics and the bandwidth of the stream in a data structure.

33. The method of claim 7, further comprising:
selecting a Differentiated Services Codepoint (DSCP) value based on the bandwidth of the stream.

34. The method of claim 33, further comprising:
loading the DSCP value into a RSVP Path message generated and sent on behalf of the server.

* * * * *